(12) United States Patent
Mitsuhashi

(10) Patent No.: US 10,444,036 B2
(45) Date of Patent: Oct. 15, 2019

(54) ENCODER SCALE, ENCODER, DRIVE APPARATUS, AND STAGE APPARATUS

(71) Applicant: NIKON CORPORATION, Tokyo (JP)

(72) Inventor: Yuichi Mitsuhashi, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 285 days.

(21) Appl. No.: 15/086,294

(22) Filed: Mar. 31, 2016

(65) Prior Publication Data

US 2016/0209241 A1 Jul. 21, 2016

Related U.S. Application Data

(63) Continuation of application No. PCT/JP2014/076043, filed on Sep. 30, 2014.

(30) Foreign Application Priority Data

Oct. 2, 2013 (JP) ................. 2013-207502

(51) Int. Cl.
*G01D 5/347* (2006.01)
*G01D 5/20* (2006.01)
*G01D 5/14* (2006.01)

(52) U.S. Cl.
CPC ............. *G01D 5/20* (2013.01); *G01D 5/145* (2013.01); *G01D 5/3473* (2013.01); *G01D 5/34715* (2013.01); *G01D 5/34792* (2013.01)

(58) Field of Classification Search
CPC .......... G01D 5/34707; G01D 5/34792; G01D 5/34715; G01D 5/20
USPC .................................................. 324/207.14
See application file for complete search history.

(56) References Cited

U.S. PATENT DOCUMENTS

2012/0013279 A1* 1/2012 Setbacken ............ G01D 5/3473
                                                       318/400.4
2015/0226581 A1* 8/2015 Schott .................... G01D 5/145
                                                       324/207.2

FOREIGN PATENT DOCUMENTS

| JP | H02-231523 A | 9/1990 |
| JP | H11-118517 A | 4/1999 |
| JP | 2010-066203 A | 3/2010 |
| JP | 2010-271069 A | 12/2010 |
| JP | 2011-047765 A | 3/2011 |
| JP | 2012-225677 A | 11/2012 |
| JP | 2013-002832 A | 1/2013 |

OTHER PUBLICATIONS

Apr. 5, 2016 International Preliminary Report on Patentability issued in International Patent Application No. PCT/JP2014/076043.

(Continued)

*Primary Examiner* — Reena Aurora
(74) *Attorney, Agent, or Firm* — Oliff PLC

(57) ABSTRACT

An encoder scale S includes a substrate 10 that rotates about a rotation axis AX and has an optical pattern along a rotation direction D on a first surface 10a crossing the rotation axis AX, of the substrate 10. The scale S also includes a first magnet M1 that is disposed on a second surface 10b of the substrate 10 different from the first surface 10a and has different magnetic poles (N-pole M1n, S-pole M1s) set therein with the rotation axis AX therebetween and a second magnet M2 that is disposed on the first surface 10a and generates magnetic fields with the N-pole M1n and S-pole M1s of the first magnet M1.

20 Claims, 10 Drawing Sheets

(56) References Cited

OTHER PUBLICATIONS

Dec. 22, 2014 Search Report issued in International Patent Application No. PCT/JP2014/076043.
May 15, 2018 Office Action Issued in Japanese Patent Application No. 2015-540501.
Mar. 23, 2017 Offiec Action issued in Chinese Patent Application No. 201480054431.4.

\* cited by examiner

FIG. 3B MAGNETIC FLUX DENSITY ROTATION DIRECTION DISTRIBUTION

FIG. 3C MAGNETIC FLUX DENSITY ROTATION DIRECTION DISTRIBUTION

ENCODER SCALE, ENCODER, DRIVE APPARATUS, AND STAGE APPARATUS

CROSS REFERENCE TO RELATED APPLICATION

This is a Continuation of PCT Application No. PCT/JP2014/076043, filed on Sep. 30, 2014. The contents of the above-mentioned application are incorporated herein by reference.

FIELD OF THE INVENTION

The present invention relates to an encoder scale, an encoder, a drive apparatus, and a stage apparatus

BACKGROUND

There are encoders serving as devices that detect the rotation amount or rotary position of a rotating object, such as the rotation axis of a rotary motor. Such an encoder includes a scale that has a predetermined optical pattern formed thereon and includes a magnet for generating a predetermined magnetic field, an optical sensor that detects the optical pattern, and a magnetic sensor that detects a magnetic pattern. Known examples of a scale for such a encoder include a scale in which a magnet is disposed on a surface on which an optical pattern is formed (e.g., see Patent Literature 1) and a scale in which a magnet is disposed on a surface opposite to a surface on which an optical pattern is formed (e.g., see Patent Literature 2). The optical sensor and magnetic sensor are mounted on a common circuit board and disposed so as to be opposed to the substrate surface of the scale on which the optical pattern is formed.

This encoder detects the rotation amount or rotary position of the rotation axis by rotating the scale integrally with the rotation axis, reading the optical pattern using the optical sensor, and detecting changes in the magnetic field using the magnetic sensor.

CITATION LIST

Patent Literature

[Patent Literature 1] Japanese Unexamined Patent Application Publication No. 2013-2832
[Patent Literature 2] Japanese Unexamined Patent Application Publication No. 2010-271069

With regard to the encoder disclosed in Patent Literature 1, the magnet can be disposed close to the magnetic sensor and thus the detection accuracy of the magnetic sensor can be improved. In this configuration, however, the magnet must be disposed so as not to interfere with the optical pattern and therefore the size of the magnet must be small. A small magnet would generate a weak magnetic field, which may be difficult to detect even when the magnet is disposed close to the magnetic sensor.

With regard to the encoder disclosed in Patent Literature 2, the magnet is disposed on the surface opposite to the surface on which the optical pattern is formed and thus does not interfere with the optical pattern, but the magnet is remote from the magnetic sensor. For this reason, it is necessary to increase the capacity (volume) of the magnet to generate a strong magnetic field so that the magnetic field can be detected by the magnetic sensor. However, a large magnet would result in a failure to meet the demand to downsize an encoder, as well as would increase the weight of the scale. This would disadvantageously increase the load on the rotation axis.

SUMMARY

In view of the foregoing, an object of the present invention is to provide an encoder scale, an encoder, a drive apparatus, and a stage apparatus that can downsize an encoder scale by generating a strong magnetic field for a magnetic detector and thus can downsize an encoder.

Solution to Problem

A first aspect of the present invention provides an encoder scale that includes a substrate configured to rotate about a rotation axis and has an optical pattern along a rotating direction on a first surface crossing the rotation axis, of the substrate. The encoder scale includes a first magnet disposed on a second surface different from the first surface, of the substrate, the first magnet having different magnetic poles set therein with the rotation axis therebetween, and a second magnet or a magnetic yoke disposed on the first surface and configured to generate magnetic fields with the magnetic poles of the first magnet.

A second aspect of the present invention provides an encoder scale including a first magnet disposed on one surface of the encoder scale and a second magnet or a magnetic yoke disposed on another surface of the encoder scale, the other surface being a back side of the one surface. The second magnet or the magnetic yoke generates a magnetic field with the first magnet, the magnetic field being to be detected by a magnetic detector.

A third aspect of the present invention provides an encoder including an encoder scale having an optical pattern disposed in a rotation direction of a rotation axis, the encoder being configured to rotate about the rotation axis and to make a change in a magnetic field at least once during one rotation, a light detector configured to detect light through the optical pattern, and a magnetic detector configured to detect the change in the magnetic field. The encoder scale is the encoder scale of the first or second aspect of the present invention.

A fourth aspect of the present invention provides an encoder including: a scale including a first magnet disposed on one surface of the scale and a second magnet or a magnetic yoke disposed on another surface of the scale, the other surface being a back side of the one surface; and a magnetic detector configured to detect a magnetic field generated between the first magnet and the second magnet or the magnetic yoke.

A fifth aspect of the present invention provides a drive apparatus including a rotating member, a drive unit configured to rotate the rotating member, and an encoder fixed to the rotating member and configured to detect position information of the rotating member. The encoder is the encoder of the third or fourth aspect of the present invention.

A sixth aspect of the present invention provides a stage apparatus including a moving object and a drive apparatus configured to move the moving object. The drive apparatus is the drive apparatus of the fifth aspect of the present invention.

Advantageous Effects of the Invention

According to the aspects of the present invention, it is possible to generate a strong magnetic field for a magnetic detector and thus to downsize an encoder scale, as well as to downsize an encoder.

BRIEF DESCRIPTION OF THE DRAWINGS

FIG. 1A-1B include diagrams showing an example of an encoder scale of a first embodiment, in which FIG. 1A is a perspective view; and FIG. 1B is a plan view showing the disposition of magnets.

FIG. 3A-3C include diagrams comparing the encoder scale of Example and encoder scales of Comparative Examples.

FIG. 6A-6B include diagrams showing an example of an encoder scale of a second embodiment, in which FIG. 6A is a sectional view; and FIG. 6B is a plan view.

FIG. 7A-7B include diagrams showing an example of an encoder scale of a third embodiment, in which FIG. 7A is a sectional view; and FIG. 7B is a sectional view showing a modification of the third embodiment.

DETAILED DESCRIPTION OF EMBODIMENTS

Now, embodiments of the present invention will be described with reference to the drawings. However, the present invention is not limited thereto. To clarify the embodiments, the drawings are scaled as appropriate, for example, the drawings are partially enlarged or highlighted. In the following description, "encoder scale" may be referred to as "scale" as appropriate.

First Embodiment

Figure 1A:
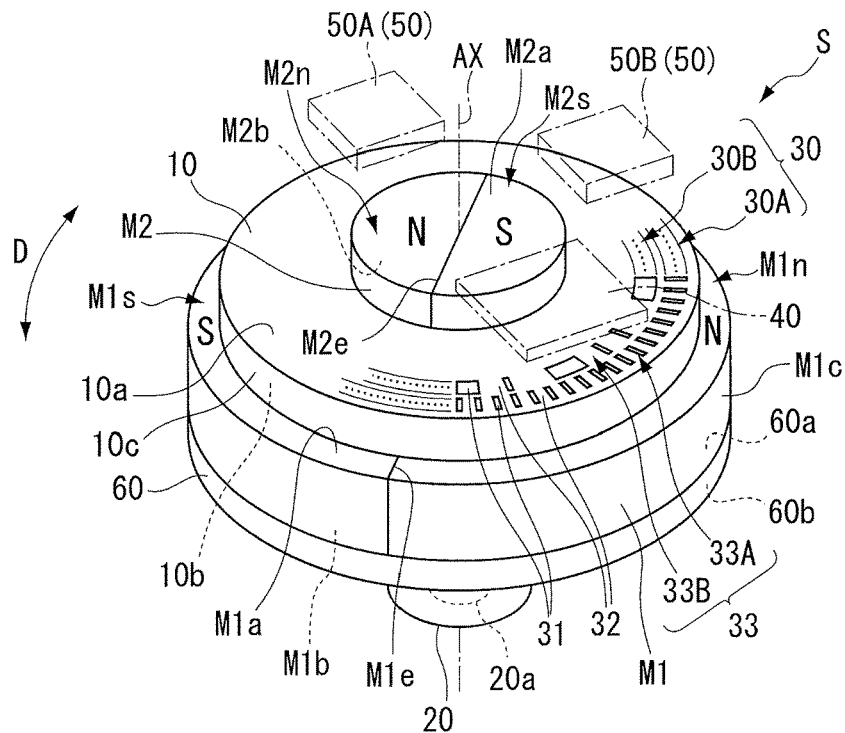
Figure 1B:
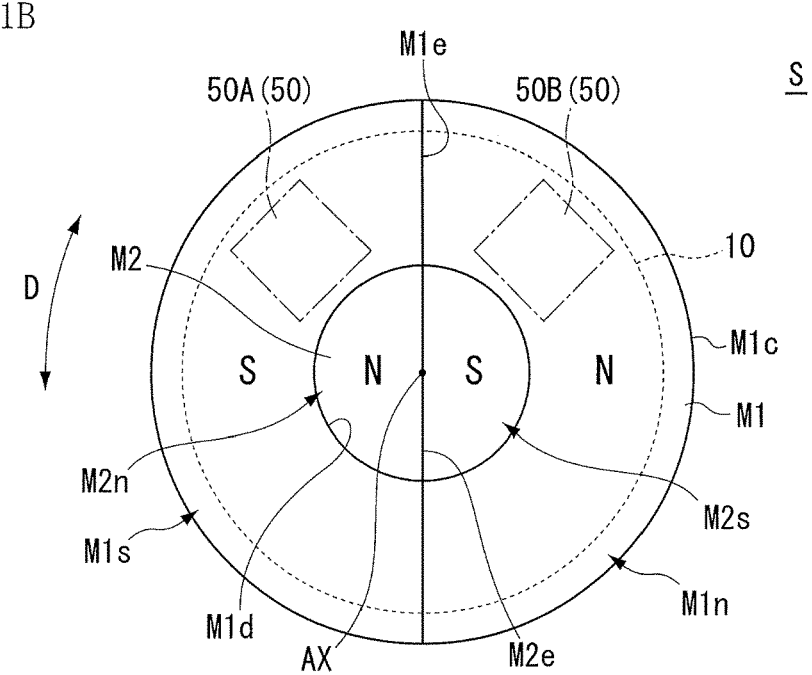
Figure 2:
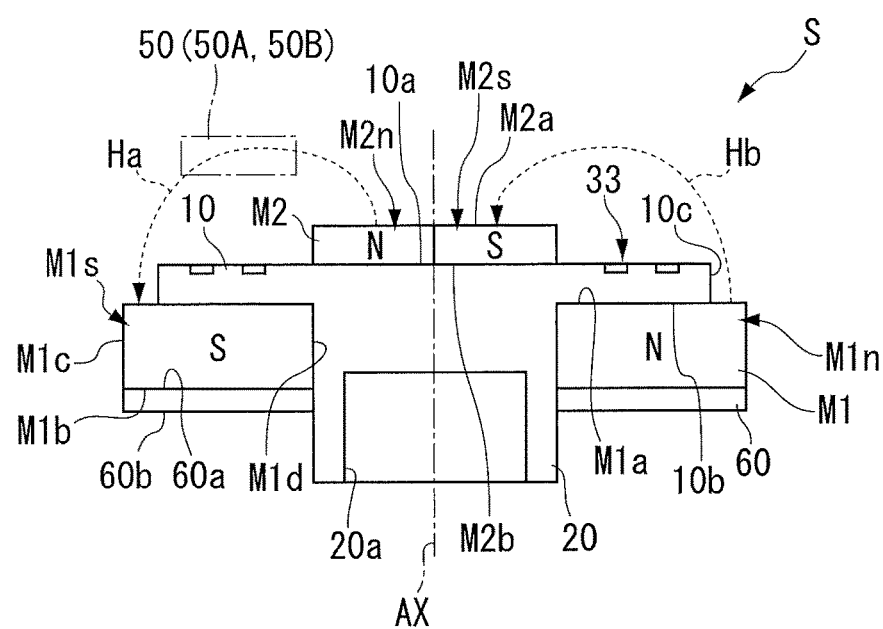
FIG. 2 is a sectional view of the encoder scale shown in FIG. 1A.

FIG. 1A-1B include diagrams showing an example of an encoder scale S of a first embodiment, in which FIG. 1A is a perspective view; and FIG. 1B is a plan view showing the disposition of magnets. FIG. 2 is a sectional view of the scale S shown in FIG. 1A. The scale S is mounted on the shaft or the like of a drive system, such as a rotary motor, and used. The scale S rotates about a rotation axis AX.

As shown in FIG. 1A, the scale S includes a substrate 10, a fixing unit 20, a first magnet M1, and a second magnet M2. The substrate 10 is formed in a circle about the rotation axis AX and with a predetermined diameter. The substrate 10 is formed of a non-magnetic material having rigidity that prevents the material from becoming easily deformed by rotation, shock, vibration, or the like, such as glass, a non-magnetic metal, resin, or ceramic. While the substrate 10 is formed with a uniform thickness, it may be formed, for example, such that the central portion thereof or the like is thicker than the peripheral portions. The material, thickness, size, or the like of the substrate 10 may be properly determined in accordance with the application thereof, for example, the number of revolutions of the shaft mounted thereon or the installation environment, such as temperature or humidity.

The substrate 10 has a first surface (upper surface, front surface) 10a and a second surface (lower surface, back surface) 10b which are perpendicular to the rotation axis AX. The first surface 10a has a track region 30 formed thereon. The track region 30 includes a first track 30A and a second track 30B. The first track 30A and second track 30B are formed in circles about the rotation axis AX. The first track 30A forms an outer portion of the track region 30, whereas the second track 30B forms an inner portion of the track region 30. An optical pattern 33 is formed on the track region 30 along a rotation direction D. The optical pattern 33 is a light reflection pattern. The optical pattern 33 includes light reflection parts 31 and reflection suppression parts 32.

The light reflection parts 31 are formed of, for example, a metal material having high reflectance, such as aluminum, or an inorganic material, such as silicon oxide ($SiO_2$). The light reflection parts 31 may be mirror-finished. The reflectance of the light reflection parts 31 is set to, for example, about 40% or more. To obtain sufficient reflectance, the light reflection parts 31 may be formed so as to have a reflectance of, for example, 70% or more. As used herein, the term "reflectance" refers to, for example, reflectance with respect to detection light used in an optical encoder.

The reflection suppression parts 32 are formed of, for example, a metal material having high light absorptivity, such as chrome (Cr), or a material having high light transmittance, such as glass. The reflection suppression parts 32 have lower reflectance than the light reflection parts 31. While the reflectance ratio between the light reflection parts 31 and the reflection suppression parts 32 may be set to any ratio, it is set to any value which allows a light detector 40 (to be discussed later) to identify light reflected by the light reflection parts 31.

In a first pattern 33A formed on the first track 30A, of the optical pattern 33, the light reflection parts 31 and reflection suppression parts 32 are formed along the rotation direction D at an equal pitch. The first pattern 33A is used as an incremental pattern. In a second pattern 33B formed on the second track 30B, of the optical pattern 33, the size of the light reflection parts 31 in the rotation direction D is set so as to match an M sequence. The second pattern 33B is used as an absolute pattern. The optical pattern 33 is only illustrative, and different optical patterns may be used.

The fixing unit 20 is formed in a cylindrical shape protruding from the second surface 10b of the substrate 10. The fixing unit 20 is fixed to a moving member to be measured, such as the shaft of a rotary motor or the like. The fixing unit 20 has a mounting hole 20a into which the shaft of a rotary motor or the like can be inserted. The fixing unit 20 may be provided with a fixing mechanism (not shown) for fixing a shaft inserted into the mounting hole 20a, such as a fixing screw.

The first magnet M1 is disposed on the second surface 10b of the substrate 10. The first magnet M1 is, for example, a neodymium-based permanent magnet. The first magnet M1 is formed in a circle (or a cylindrical shape). The first magnet M1 is disposed so as to surround the fixing unit 20. The first magnet M1 has a first surface (upper surface, front surface) M1a and a second surface (lower surface, back surface) M1b in the direction of the rotation axis AX. The first magnet M1 is fixed to the second surface 10b of the substrate 10 through an adhesive or the like (not shown). Thus, the first magnet M1 rotates integrally with the substrate 10. As shown in FIGS. 1B and 2, the inner circumferential surface M1d of the first magnet M1 is in contact with the fixing unit 20. The inner circumferential surface M1d of the first magnet M1 may be fixed to the outer circumferential surface of the fixing unit 20 through an adhesive or the like (not shown).

The outer diameter of the first magnet M1 is larger than the diameter of the substrate 10. Accordingly, the outer circumferential surface M1c of the first magnet M1 and the vicinity thereof are disposed so as to protrude from the peripheral edge 10c of the substrate 10. Thus, the first magnet M1 easily generates a magnetic field toward the first surface 10a of the substrate 10 (that is, toward a magnetic detector 50). Note that whether the outer circumferential surface M1c of the first magnet M1 is disposed so as to protrude from the peripheral edge 10c of the substrate 10 is optional. The volume (size) of the first magnet M1 is set to a size which allows for generation of a magnetic field detectable by the magnetic detector 50 (to be discussed later). The thickness (the size in the direction of the rotation axis AX) of the first magnet M1 is larger than that of the substrate 10. The first magnet M1 has a larger volume than the second magnet M2 (to be discussed later).

The second magnet M2 is disposed on the first surface 10a of the substrate 10. As with the first magnet M1, the second magnet M2 is, for example, a neodymium-based permanent magnet. The second magnet M2 is formed in a disc shape (or a cylindrical shape). The second magnet M2 is disposed in such a manner that the center thereof overlaps the rotation axis AX. The second magnet M2 has a first surface (upper surface, front surface) M2a and a second surface (lower surface, back surface) M2b in the direction of the rotation axis AX. The second surface M2b is fixed to the first surface 10a of the substrate 10 through an adhesive or the like (not shown). Thus, the second magnet M2 rotates integrally with the substrate 10.

The diameter of the second magnet M2 is smaller than the inner diameter of the second track 30B. Thus, the second magnet M2 is disposed between the rotation axis AX and optical pattern 33 (second pattern 33B). As seen above, the position and size of the second magnet M2 are set to those which prevent the second magnet M2 from overlapping the optical pattern 33. This prevents the second magnet M2 from blocking detection light emitted toward the optical pattern 33 or reflected light from the optical pattern 33.

While the diameter of the second magnet M2 is approximately equal to the inner diameter of the first magnet M1 (or the outer diameter of the fixing unit 20) in FIG. 2, the diameter of the second magnet M2 may be larger or smaller than the inner diameter of the first magnet M1. While the second magnet M2 is thinner than the first magnet M1, the second magnet M2 may be thicker than the first magnet M1.

As shown in FIG. 1B, the first magnet M1 has an N-pole M1n magnetized to an N-pole and an S-pole M1s magnetized to an S-pole. The N-pole M1n and S-pole M1s are separated by a straight line (boundary M1e) passing through the rotation axis AX. In the first magnet M1 shown in FIG. 1B, the N-pole M1n lies on the right side of the boundary M1e, and the S-pole M1s lies on the left side of the boundary M1e. As seen above, the first magnet M1 is disposed in such a manner that the rotation axis AX is sandwiched between the different magnetic poles.

As with the first magnet M1, the second magnet M2 has an N-pole M2n magnetized to an N-pole and an S-pole M2s magnetized to an S-pole. The N-pole M2n and S-pole M2s are separated by a straight line (boundary M2e) passing through the rotation axis AX. In the second magnet M2 shown in FIG. 1B, the S-pole M2s lies on the right side of the boundary M2e, and the N-pole M2n lies on the left side of the boundary M2e. As seen above, the second magnet M2 is formed in such a manner that the rotation axis AX is sandwiched between the different magnetic poles. The first magnet M1 and second magnet M2 are disposed in such a manner that the boundary M1e and boundary M2e are arranged in parallel in the direction of the rotation axis AX.

The N-pole M1n of the first magnet M1 and the S-pole M2s of the second magnet M2 are disposed on the right side of the rotation axis AX, whereas the S-pole M1s of the first magnet M1 and the N-pole M2n of the second magnet M2 are disposed on the left side of the rotation axis AX. As seen above, the first magnet M1 and second magnet M2 are disposed in such a manner that the different magnetic poles are arranged in the direction of the rotation axis AX.

As shown in FIG. 2, the disposition of the first magnet M1 and second magnet M2 results in, for example, the generation of a magnetic field Ha directed from the N-pole M2n of the second magnet M2 to the S-pole M1s of the first magnet M1, as well as the generation of a magnetic field Hb directed from the N-pole M1n of the first magnet M1 to the S pole M2s of the second magnet M2. The magnetic fields Ha and Hb generate magnetic lines of force, which then pass through the magnetic detector 50 (50A, 50B) (to be discussed later). Thus, the magnetic detector 50 can detect the magnetic fields Ha and Hb with high accuracy.

The first magnet M1 has a back yoke 60 disposed on a second end surface M1b thereof in the direction of the rotation axis AX. The back yoke 60 is formed, for example, of a soft magnetic material and in a circle. The back yoke 60 has an upper surface 60a and a lower surface 60b. The upper surface 60a is fixed to the second surface M1b of the first magnet M1 through an adhesive or the like (not shown). The outer diameter and inner diameter of the back yoke 60 are approximately equal to those of the first magnet M1. Thus, approximately the entire second surface M1b of the first magnet M1 is covered by the back yoke 60. The back yoke 60 is thinner than the first magnet M1.

The back yoke 60 can confine a magnetic field moving from the first magnet M1 in the downward direction (in the direction in which the magnetic field moves away from the scale S) and strengthen a magnetic field moving toward an upper portion of the scale S (the second magnet M2). Note that whether the back yoke 60 is disposed on the second surface M1b of the first magnet M1 is optional.

Figure 3A:
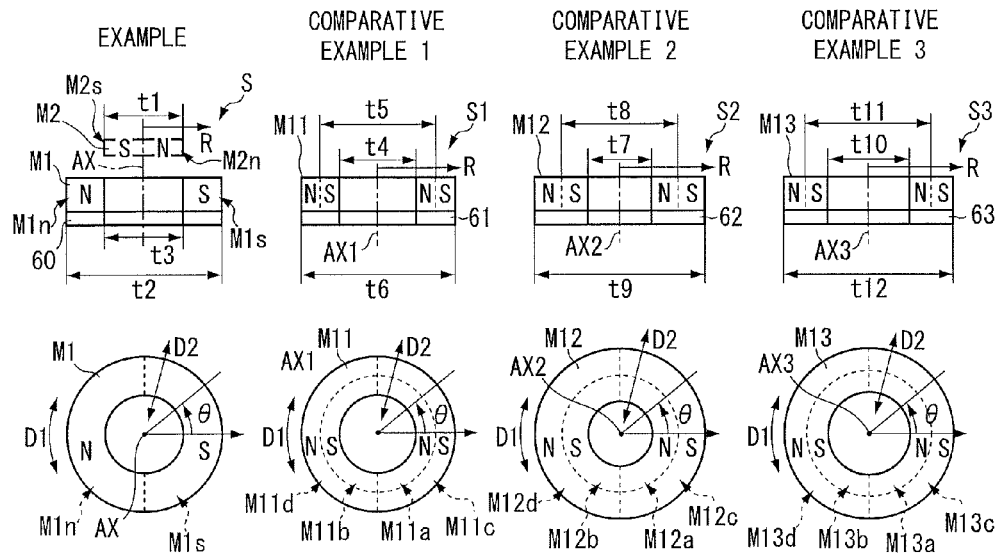
Figure 3A:
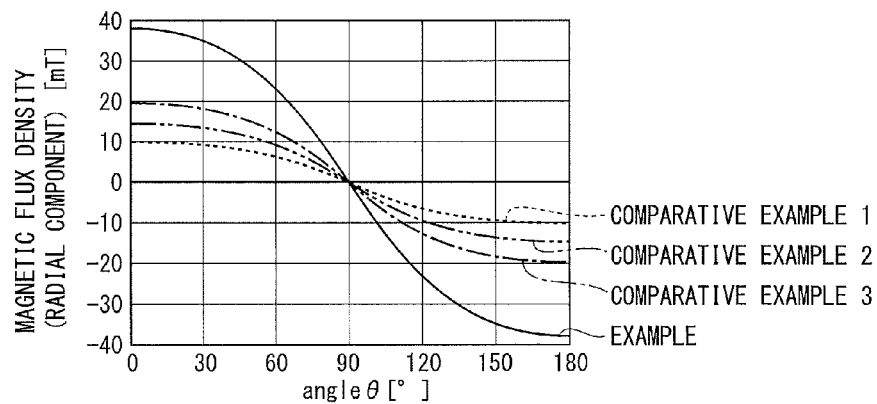
Figure 3A:
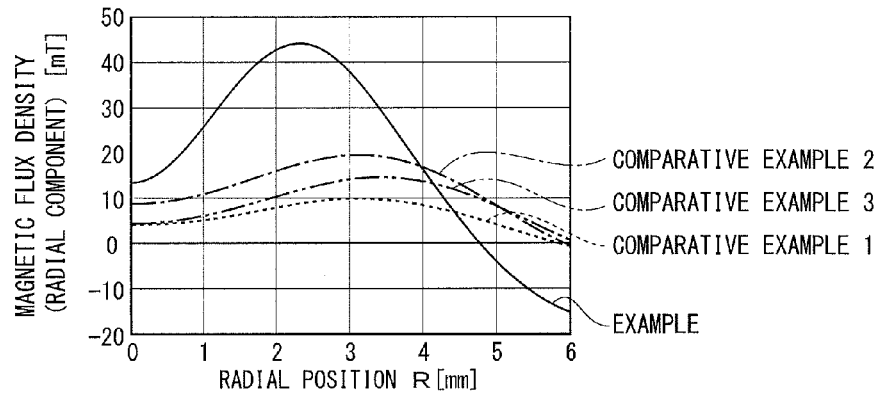

FIG. 3A-3C include diagrams comparing the scale S of the first embodiment (Example) and scales S1 to S3 of Comparative Examples 1 to 3. As shown in FIG. 3A, for the scale S, the diameter t1 of the second magnet M2 is 5 mm; the outer diameter t2 of the first magnet M1 is 10.2 mm; the inner diameter t3 of the first magnet M1 is 5.2 mm; the thickness (the size in the direction of the rotation axis AX) of the first magnet M1 is 2 mm; the thickness of the second magnet M2 is 1 mm; and the thickness of the back yoke 60 is 1 mm.

The scale S1 of Comparative Example 1 includes a magnet M11 and a back yoke 61. The magnet M11 is formed in a circle around a rotation axis AX1. The magnet M11 is divided into four regions. The magnet M11 is divided into two regions consisting of radially inner and outer regions and serving as magnetic poles when seen from the direction of the rotation axis AX1. The radially inner and outer regions are each divided into two regions consisting of right and left regions with the rotation axis AX1 therebetween and serving as magnetic poles. Of the radially inner two regions of the magnet M11, a region M11a on the right side of the rotation axis AX1 serves as an N-pole, and a region M11b on the left side of the rotation axis AX1 serves as an S-pole. Of the radially outer two regions of the magnet M11, a region M11c on the right side of the rotation axis AX1 serves as an S-pole, and a region M11d on the left side of the rotation axis AX1 and serves as an N-pole. For the scale S1, the inner diameter t4 of the magnet M11 is 5.2 mm; the diameter t5 of the boundary is 7.7 mm; the outer diameter t6 of the magnet M11 is 10.2 mm; the thickness of the magnet M11 is 2 mm; and the thickness of the back yoke 61 is 1 mm. As seen above, the magnet M11 of the scale S1 has sizes similar to those of the magnet M11 of the present embodiment.

The scale S2 of Comparative Example 2 includes a magnet M12 and a back yoke 62. The magnet M12 is formed in a circle around a rotation axis AX2. As with the magnet M11, the magnet M12 is divided into four regions: M12a (N-pole), M12b (S-pole), M12c (S-pole), and M12d (N-pole). For the scale S2, the inner diameter t7 of the magnet M12 is 4.2 mm; the diameter t8 of the boundary is 7.7 mm; and the outer diameter t9 of the magnet M12 is 11.2 mm; the thickness of the magnet M12 is 2 mm; and the thickness of the back yoke 62 is 1 mm. As seen above, the magnet M12 of the scale S2 has larger sizes than those of the magnet M1 of the present embodiment.

The scale S3 of Comparative Example 3 includes a magnet M13 and a back yoke 63. The magnet M13 is formed in a circle around a rotation axis AX3. As with the magnets M11 and M12, the magnet M13 is divided into four regions: M13a (N-pole), M13b (S-pole), M13c (S-pole), and M13d (N-pole). For the scale S3, the inner diameter t10 of the magnet M13 is 5.2 mm; the diameter t11 of the boundary is 8.2 mm; the outer diameter t12 of the magnet M13 is 11.2 mm; the thickness of the magnet M13 is 2 mm; and the thickness of the back yoke 63 is 1 mm. As seen above, the magnet M13 of the scale S3 has larger sizes than those of the magnet M1 of the present embodiment and those of the magnet M12 of the scale S2.

Note that any of Comparative Examples 1 to 3 is not provided with a magnet corresponding to the second magnet M2 of the present embodiment.

FIG. 3B is a graph showing the distribution of the magnetic flux density in a rotation direction D1 of the scale S of Example and the scales S1 to S3 of Comparative Examples 1 to 3. The graph represents the values of the magnetic flux density measured in positions away from the rotation axes AX, and AX1 to AX3 in a radial direction D2 by a predetermined distance (3 mm) and away from the surfaces of the first magnet M1 and magnets M11 to M13 in the directions of the rotation axes AX and AX1 to AX3 by a predetermined distance (3.96 mm). The vertical axis of the graph represents the magnetic flux density (in mT). The horizontal axis of the graph represents counterclockwise angles θ with respect to the right directions of the rotation axes AX, and AX1 to AX3 in FIG. 3A serving as reference positions (0°). The angles θ are shown in a range of θ is 0°≤θ≤180°. The graph shows magnetic field directions from the rotation axes AX and AX1 to AX3 to outward radial directions D2 as positive directions.

At 0°≤θ<90°, the scale S of Example generates a magnetic field directed from the N-pole M2n of the second magnet M2 to the S-pole M1s of the first magnet M1. Accordingly, the graph shows positive values. Since θ=90° represents the boundary between the N-pole and S-pole, no magnetic field is generated between the first magnet M1 and second magnet M2. At 90°<θ≤180°, the scale S generates a magnetic field directed from the N pole M1n of the first magnet M1 to the S pole M2s of the second magnet M2. Accordingly, the graph shows negative values.

At 0°≤θ<90°, the scales S1 to S3 of Comparative Examples 1 to 3 generate magnetic fields directed from the inside regions M11a to M13a (N-poles) of the magnets M11 to M13 to the outside regions M11c to M13c (S-poles). Accordingly, the graph shows positive values. Since θ=90° represents the boundary between the N-pole and S-pole, no magnetic field is generated. At 90°<θ≤180°, the scales S1 to S3 generate magnetic fields directed from the outside regions M11d to M13d (N-poles) of the magnets M11 to M13 to the inside regions M11b to M13b (S-poles). Accordingly, the graph shows negative values.

As shown in FIG. 3B, for the scale S of Example, the absolute values of the magnetic flux density in the rotation direction D1 are larger than those of the scales S1 to S3 of Comparative Examples 1 to 3. Thus, it is confirmed that for the scale S, both the magnetic field directed from the N-pole to the S-pole and the magnetic field directed from the S-pole to the N-pole are stronger than those of the scales S1 to S3.

FIG. 3C is a graph showing the distribution of the magnetic flux density in the radial direction D2 of the scale S of Example and the scales S1 to S3 of Comparative Examples 1 to 3. The graph represent the values of the magnetic flux density measured in positions away from the surfaces of the first magnet M1 and magnets M11 to M13 in the directions of the rotation axes AX and AX1 to AX3 by a predetermined distance (3.96 mm). The vertical axis of the graph represents the magnetic flux density (in mT). The horizontal axis of the graph represents the rightward distances R from the rotation axes AX, and AX1 to AX3 in FIG. 3A. The distances R are shown in a range of 0 mm≤R≤6 mm. The graph shows the strength of magnetic fields directed from the N-poles to S-poles as positive directions and shows the strength of magnetic fields directed from the S-poles to N-poles as negative directions.

As shown in FIG. 3C, the scale S of Example takes a maximum value of about 43 mT when the position in the radial direction D2 is about 2.2 mm. The scale S1 of Comparative Example 1 takes a maximum value of about 10 mT when the position in the radial direction D2 is about 3.0 mm. The scale S2 of Comparative Example 2 takes a maximum value of about 20 mT when the position in the radial direction D2 is about 3.1 mm. The scale S3 of Comparative Example 3 takes a maximum value of about 15 mT when the position in the radial direction D2 is about 3.2 mm.

As shown in FIG. 3A-3C, it is confirmed that, for the scale S of Example, the maximum value (about 43 mT) of the magnetic flux density is larger than those of scales S1 to S3 of Comparative Examples 1 to 3 and that the position (about 2.2 mm) in the radial direction D2 corresponding to the maximum value is close to the rotation axis AX. Thus, the scale S can generate a stronger magnetic field than the other scales, S1 to S3. Also, since, for the scale S, the magnetic field was generated in the position close to the rotation axis AX compared to the scales S1 to S3, it is possible to dispose the magnetic sensor near the rotation axis AX and thus to downsize an encoder.

As seen above, according to the first embodiment, the first magnet M1 having the different magnetic poles (N-pole M1n and S-pole M1s) with the rotation axis AX therebetween is disposed on the second surface 10b of the substrate 10, and the second magnet M2, which generates the magnetic fields Ha and Hb with the S-pole M1s and N-pole M1n of the first magnet M1, is disposed on the first surface 10a of the substrate 10. Thus, the magnetic fields Ha and Hb can be effectively strengthened compared to the cases in which a single magnet is disposed on a scale S. As a result, the scale S can be downsized.

Further, according to the first embodiment, the first magnet M1 and second magnet M2 need not be divided into four regions and only have to be divided into two regions serving as different magnetic poles. Thus, the non-magnetized region between the regions can be reduced. As a result, the first magnet M1 and second magnet M2 can generate stronger magnetic fields. Furthermore, both the first magnet M1 and second magnet M2 can be obtained by only magnetizing two regions. Thus, it is possible to avoid a complicated magnetization process and thus to reduce the magnet production cost.

<Encoder>

Figure 4:
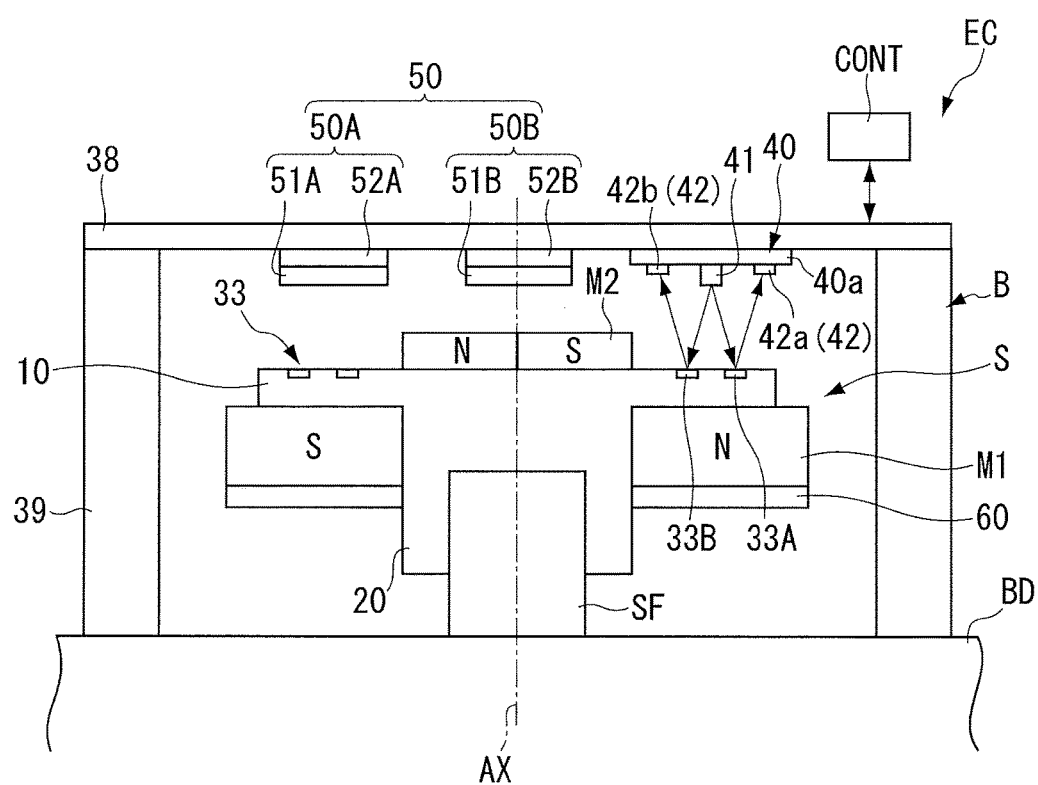
FIG. 4 is a sectional view showing an example of an embodiment of an encoder.

FIG. 4 is a sectional view showing an example of an encoder using the encoder scale S shown in FIG. 1A-1B. In the following description, elements identical or similar to those in the above embodiment are given the same reference signs and the description thereof will be omitted or simplified. As shown in FIG. 4, an encoder EC includes a scale (encoder scale) S, a main body B, and a controller CONT. The scale S is the scale S of the first embodiment.

The scale S is fixed to a shaft SF of a rotary motor or the like and rotates integrally with the shaft SF. The main body B is fixed to a non-rotary unit BD, such as the casing of the rotary motor, and includes a cabinet 39 and a circuit board 38. The circuit board 38 has a light detector and a magnetic detector 50 mounted thereon. The light detector 40 detects light through the optical pattern 33. The magnetic detector 50 detects magnetic fields generated by the first magnet M1 and second magnet M2 and thus detects changes in the magnetic fields. The cabinet 39 may be provided with an adjustment mechanism for adjusting the positions of the light detector 40 and magnetic detector 50 in the scale S.

The light detector 40 includes a chip substrate 40a which is rectangular in plan view. The chip substrate 40a has a light emitter 41, a light receiver 42, and a control circuit (not shown) formed thereon. The light emitter 41 emits detection light toward the optical pattern 33. The light emitter 41 is formed so as to be capable of emitting laser light having a predetermined wavelength in one or more directions. The emission of detection light by the light emitter 41 is controlled by the controller CONT.

The light receiver 42 receives the light through the optical pattern 33. In the present embodiment, the light receiver 42 receives reflected light from the optical pattern 33. The light receiver 42 includes multiple light-receiving elements. The light-receiving elements are, for example, two-dimensional sensors (image sensors). Examples of the two-dimensional sensors include a charge coupled device (CCD) image sensor and a complementary metal oxide semiconductor (CMOS) image sensor. The light receiver 42 includes a first light receiver 42a and a second light receiver 42b. The first light receiver 42a detects reflected light from the first pattern 33A, which is an incremental pattern. The second light receiver 42b detects reflected light from the second pattern 33B, which is an absolute pattern.

The light detector 40 generates an incremental signal from reflected light from the first pattern 33A received by the first light receiver 42a, as well as generates an absolute signal from reflected light from the second pattern 33B received by the second light receiver 42b. The rotation amount or rotary position of the scale S is measured on the basis of these signals. The measurement result is transmitted upon a request from the controller CONT or at predetermined intervals.

The magnetic detector 50 includes a first detector 50A and a second detector 50B. The first detector 50A includes a bias magnet 51A and a magnetic resistance element 52A. The second detector 50B includes a bias magnet 51B and a magnetic resistance element 52B. The first detector 50A and second detector 50B have the same configuration. Hereafter, a configuration common to the bias magnets 51A and 51B may be referred to as "bias magnet 51." Similarly, a configuration common to the magnetic resistance elements 52A and 52B may be referred to as "magnetic resistance element 52."

The bias magnet 51 generates a combined magnetic field of magnetic fields generated by the first magnet M1 and second magnet M2 of the scale S. The material of the bias magnet 51 is, for example, a rare earth element having a large magnetic force, such as samarium or cobalt. While, in FIG. 4, the bias magnet 51 and magnetic resistance element 52 are shown as being in contact with each other for convenience, the bias magnet 51 is actually disposed in a position that is not in contact with nor adjacent to the magnetic resistance element 52.

Figure 5A:
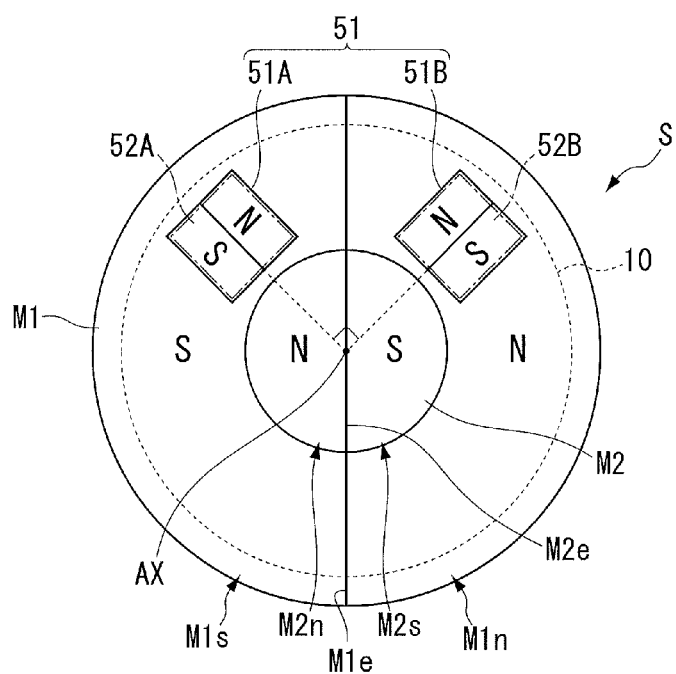
FIG. 5A-5D include diagrams showing an example of a magnetic detector of the encoder shown in FIG. 4.

FIG. 5A is a plan view showing the relationship among the bias magnet 51, first magnet M1, and second magnet M2. In FIG. 5A, the substrate 10 is shown by a broken line. As shown in FIG. 5A, the bias magnets 51A and 51B are disposed in positions shifted from each other by 90° in the rotation direction when seen from the direction of the rotation axis AX. In FIG. 5A, the bias magnet 51A is disposed on the left side, and the bias magnet 51B is disposed on the right side. One end (upper-right) of the bias magnet 51A in the rotation direction serves as an N-pole, and the other end (lower-left) serves as an S-pole. One end (upper-left) of the bias magnet 51B in the rotation direction serves as an N-pole, and the other end (lower-right) serves as an S-pole.

Figure 5B:

FIG. 5B includes diagrams showing the direction of a combined magnetic field of a magnetic field generated by the first magnet M1 and second magnet M2 and a magnetic field generated by the bias magnet 51. The first magnet M1 and second magnet M2 generate a magnetic field H1 directed to the upper left of FIG. 5A in the position in which the bias magnet 51A is disposed. The magnetic field H1 corresponds to the magnetic field Ha shown in FIG. 2. The bias magnet 51A generates a magnetic field H3 directed to the lower left of FIG. 5A. As seen above, the bias magnet 51A is disposed so as to form the magnetic field H3 directed in a direction perpendicular to the magnetic field H1. A combined magnetic field H5 of the magnetic field H1 and magnetic field H3 is generated so as to be directed to the left of FIG. 5A.

The first magnet M1 and second magnet M2 also generate a magnetic field H2 directed to the lower left of FIG. 5A in the position in which the bias magnet 51B is disposed. The magnetic field H2 corresponds to the magnetic field Hb shown in FIG. 2. The bias magnet 51B generates a magnetic field H4 directed to the lower right of FIG. 5A. As seen above, the bias magnet 51B is disposed so as to generate the magnetic field H4 directed in a direction perpendicular to the magnetic field H2. A combined magnetic field H6 of the magnetic field H2 and magnetic field H4 is generated so as to be directed to the bottom of FIG. 5A.

When the scale S is rotated by 180° in the state shown in FIG. 5A, the direction of the magnetic field H1 is changed by 180° (becomes the lower-right direction) and thus a downward combined magnetic field H5 is generated. Similarly, when the scale S is rotated by 180° in the state shown in FIG. 5A, the direction of the magnetic field H2 is changed by 180° (becomes the upper-right direction) and thus a rightward combined magnetic field H6 is generated. As seen above, the directions of the combined magnetic fields H5 and H6 are changed to the downward direction and rightward direction, respectively.

Figure 5C:
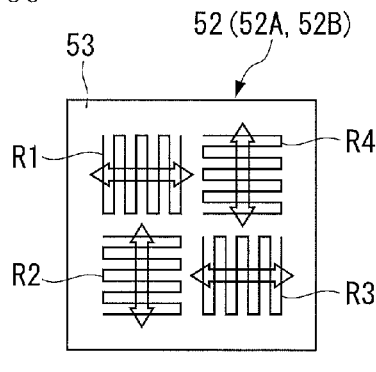

FIG. 5C is a plan view showing the configuration of the magnetic resistance element 52. As shown in FIG. 5C, the magnetic resistance element 52 includes a magnetic thin film 53 and electrical resistance patterns R1 to R4. The magnetic thin film 53 is formed of a magnetic material. The electrical resistance patterns R1 to R4 are repeated patterns formed of, for example, metal wires or the like. In the electrical resistance patterns R1 and R3, longitudinal patterns are repeated in the vertical direction of FIG. 5C. In the electrical resistance patterns R2 and R4, longitudinal patterns are repeated in the horizontal direction of FIG. 5C. If the directions of the combined magnetic fields H5 and H6 acting on the magnetic resistance element 52 come close to a direction perpendicular to the direction of the current passing through the repeated pattern, the electrical resistances of the electrical resistance patterns R1 to R4 are reduced.

Figure 5D:
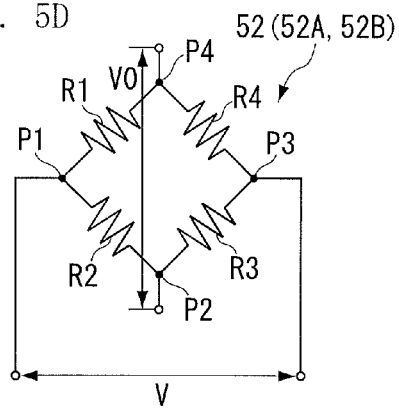

FIG. 5D is a circuit diagram showing the magnetic resistance element 52. As shown in FIG. 5D, the electrical resistance patterns R1 and R2 are connected through a junction P1; the electrical resistance patterns R2 and R3 are connected through a junction P2; the electrical resistance patterns R3 and R4 are connected through a junction P3; and the electrical resistance patterns R4 and R1 are connected through a junction P4. A constant voltage $V_0$ is applied between the junction P4 and junction P2. An output voltage V is generated between the junction P1 and junction P3. When the electrical resistances of the electrical resistance patterns R1 to R4 are reduced, the output value of the output voltage V is changed. The magnetic resistance element 52 converts the direction of the magnetic field into an electrical signal using the change in the output voltage V. The magnetic resistance element 52 then transmits the electrical signal as the detection result to the controller CONT.

Description will be made using the combined magnetic fields H5 and H6 as an example. Since the leftward combined magnetic field H5 acts on the magnetic resistance element 52A, the electrical resistances of the electrical resistance patterns R1 and R3 are reduced. Since the downward combined magnetic field H6 acts on the magnetic resistance element 52B, the electrical resistances of the electrical resistance patterns R2 and R4 are reduced.

On the other hand, when the scale S is being rotated by 180°, the combined magnetic field H5 acts on the magnetic resistance element 52A while gradually changing the direction thereof from the leftward direction to downward direction. When the rotation of the scale S by 180° is complete, the downward combined magnetic field H5 acts on the magnetic resistance element 52A. The change in the direction of the combined magnetic field H5 reduces the electrical resistances of the electrical resistance patterns R2 and R4 and increases the electrical resistances of the electrical resistance patterns R1 and R3.

The combined magnetic field H6 acts on the magnetic resistance element 52B while gradually changing the direction thereof from the downward direction to leftward direction. When the rotation of the scale S by 180° is complete, the leftward combined magnetic field H6 acts on the magnetic resistance element 52B. The change in the direction of the combined magnetic field H6 reduces the electrical resistances of the electrical resistance patterns R1 and R3 and increases the electrical resistances of the electrical resistance patterns R2 and R4. As seen above, the rotation of the scale S changes the electrical resistances of the electrical resistance patterns R1 to R4 of the magnetic resistance element 52A and 52B, thereby changing the output value of the output voltage V.

The change in the output voltage V is transmitted from the magnetic detector 50 to the circuit board 38, and the change number is counted. This change number corresponds to the number of revolutions of the scale S with respect to the reference position. Information about the number of revolutions of the scale S is transmitted to the controller CONT upon a request from the controller CONT or at predetermined intervals.

As seen above, the encoder EC can obtain both the information about the number of revolutions of the scale S based on the information from the magnetic detector 50 and information about the rotary position of the scale S based on the information from the light detector 40. Further, the first magnet M1 and second magnet M2 of the scale S generate strong magnetic fields and thus the magnetic detector 50 can detect the magnetic fields reliably and accurately. Furthermore, the small scale S is used and the magnetic detector 50 can be disposed in a position close to the rotation axis AX and thus the encoder EC can be downsized. These effects of the encoder EC can be produced even when scales of other embodiments and modifications are used.

Second Embodiment

A second embodiment will be described. While, in the first embodiment, the second magnet M2 is disposed in the scale S, the second magnet M2 need not be disposed. For example, a magnetic yoke may be disposed in place of the second magnet M2. Elements identical to or similar to those in the above embodiment are given the same reference signs and the description thereof will be omitted or simplified.

Figure 6A:
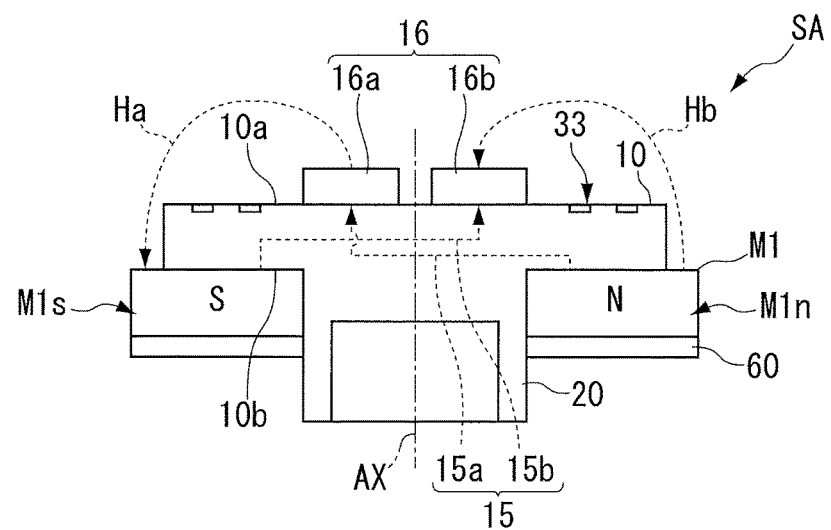
Figure 6B:
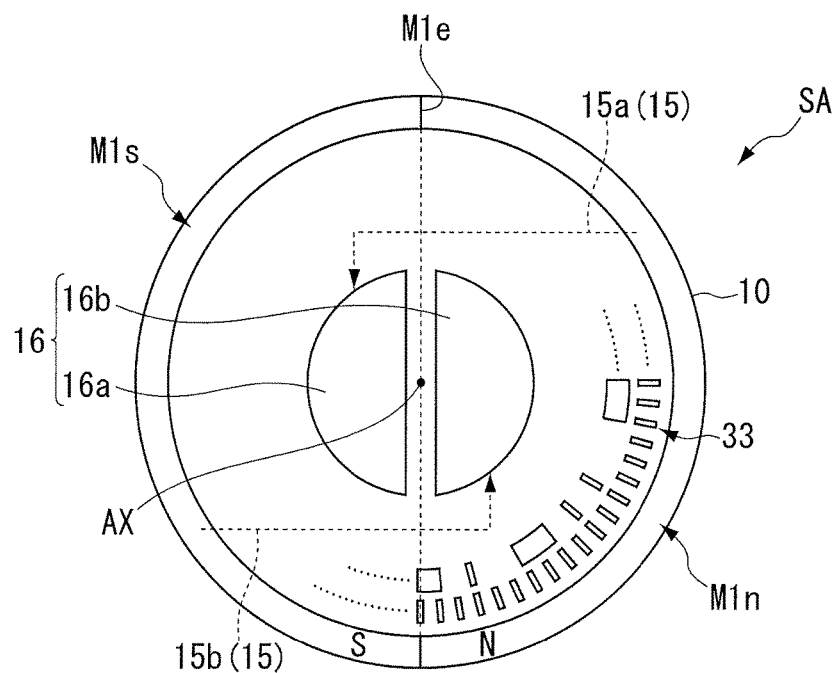

FIG. 6A-6B include diagrams showing an example of an encoder scale SA of a second embodiment. As shown in FIG. 6A, the encoder scale SA has a magnetic yoke 16 formed on a first surface 10a of a substrate 10. The magnetic yoke 16 is formed of, for example, a soft magnetic material, such as iron. As shown in FIG. 6B, the magnetic yoke 16 includes an approximately semicircular first yoke 16a and second yoke 16b. The first yoke 16a and second yoke 16b are fixed to the first surface 10a of the substrate 10 through an adhesive or the like (not shown). Thus, the first yoke 16a and second yoke 16b rotate integrally with the substrate 10.

The first yoke 16a and second yoke 16b are spaced from each other with a rotation axis AX therebetween. The first yoke 16a and second yoke 16b are disposed so as to be symmetrical with respect to the boundary M1e between an N-pole M1n and an S-pole M1s of a first magnet M1.

The sizes of the first yoke 16a and second yoke 16b are set to smaller sizes than the inner diameter of an optical pattern 33. Thus, the first yoke 16a and second yoke 16b are disposed between the rotation axis AX and optical pattern 33. As seen above, the positions and sizes of the first yoke 16a and second yoke 16b are set such that these yokes do not overlap the optical pattern 33. This prevents the first yoke 16a or second yoke 16b from blocking detection light emitted toward the optical pattern 33 or reflected light from the optical pattern 33.

The substrate 10 also has a magnetic circuit 15 formed thereon. The magnetic circuit 15 includes a first circuit 15a and a second circuit 15b. The first circuit 15a connects the N-pole M1n of the first magnet M1 and the first yoke 16a. Due to the first circuit 15a, a magnetic pole similar to an N-pole is formed in the first yoke 16a. Thus, as in the first embodiment, a magnetic field Ha is generated between the S-pole M1s of the first magnet M1 and the first yoke 16a. Note that the magnetic force of the first yoke 16a depends on the magnetic force of the first magnet M1. Accordingly, if a first magnet M1 having a strong magnetic force is used, it is possible to strengthen the magnetic force of the first yoke 16a and to generate a strong magnetic field Ha.

The second circuit 15b connects the S-pole M1s of the first magnet M1 and the second yoke 16b. Due to the second circuit 15b, a magnetic pole similar to an S-pole is formed in the second yoke 16b. Thus, as in the first embodiment, a magnetic field Hb is generated between the N-pole M1n of the first magnet M1 and the second yoke 16b. As described above, if a first magnet M1 having a strong magnetic force is used, it is possible to strengthen the magnetic force of the first yoke 16b and to generate a strong magnetic field Hb.

For example, a wire rod or thin film formed of a magnetic material may be used as the first circuit 15a and second circuit 15b to connect the N-pole M1n and first yoke 16a and connect the S-pole M1s and second yoke 16b through the substrate 10. The first circuit 15a and second circuit 15b are not limited to these forms and may take any other forms as long as they can magnetically connect the magnets and yokes.

The second embodiment thus configured produces effects similar to those of the first embodiment. Although the substrate 10 must be provided with the magnetic circuit 15, there is no need to dispose a second magnet M2 on the first surface 10a of the substrate 10. Thus, the number of magnets used is reduced, allowing for a reduction in production cost. The configuration of an encoder using the encoder scale SA of the second embodiment is approximately similar to that of the encoder EC shown in FIG. 4.

Third Embodiment

A third embodiment will be described. While, in the first embodiment, the disc-shaped second magnet M2 is disposed in the scale S, a second magnet having a shape different from a disc shape may be disposed. Elements identical to or similar to those in the above embodiments are given the same reference signs and the description thereof will be omitted or simplified.

Figure 7A:
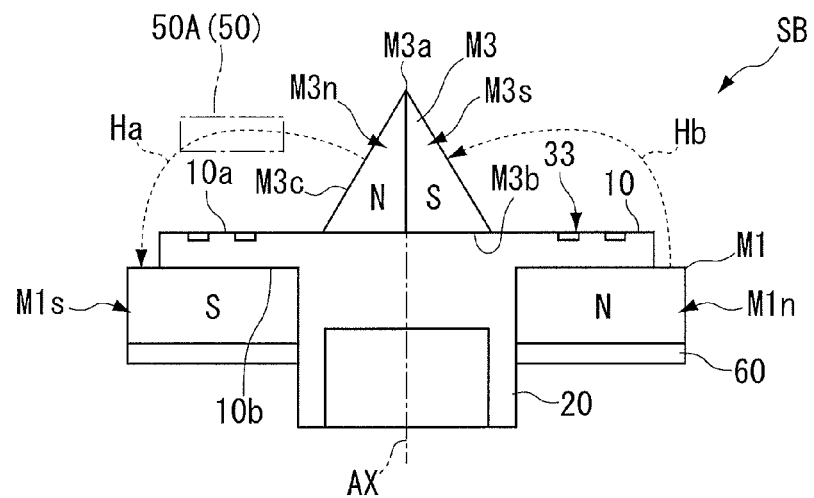

FIG. 7A is a sectional view showing an example of an encoder scale SB of a third embodiment. As shown in FIG. 7A, the encoder scale SB has a second magnet M3 disposed on a first surface 10a of a substrate 10. The second magnet M3 is formed in a cone. The second magnet M3 is, for example, a neodymium-based permanent magnet. The second magnet M3 is disposed in such a manner that the center thereof including a top M3a overlaps a rotation axis AX. The bottom M3b of the second magnet M3 is fixed to the first surface 10a of the substrate 10 through an adhesive or the like (not shown). Thus, the second magnet M3 rotates integrally with the substrate 10.

The outer diameter of the bottom M3b of the second magnet M3 is smaller than the inner diameter of an optical pattern 33. Thus, the second magnet M3 is disposed between the rotation axis AX and optical pattern 33. As seen above, the position and size of the second magnet M3 are set such that the second magnet M2 does not overlap the optical pattern 33. This prevents the second magnet M3 from blocking detection light emitted toward the optical pattern 33 or reflected light from the optical pattern 33.

The second magnet M3 has an N-pole M3n magnetized to an N-pole and an S-pole M3s magnetized to an S-pole. The N-pole M3n and S-pole M3s are separated by a straight line passing through the rotation axis AX. In the second magnet M3, the S-pole M3s lies on the right side of the rotation axis AX, and the N-pole M3n lies on the left side of the rotation axis AX. As seen above, the second magnet M3 is formed in such a manner that the rotation axis AX is sandwiched between the different magnetic poles.

The distance from the bottom M3b to top M3a (the height of the second magnet M3) is larger than that of the second magnet M2 of the first embodiment. Note that the height of the second magnet M3 is set to a height such that the second magnet M3 does not interfere with a circuit board (see FIG. 4) disposed above the scale SB. As shown in FIG. 7A, a magnetic field Ha is generated between the S-pole M1s of the first magnet M1 and the N-pole M3n of the second magnet M3 so as to be directed from a slope M3c of the second magnet M3 to the first magnet M1. Similarly, a magnetic field Hb is generated between the magnetic pole M1n of the first magnet M1 and the M pole M3s of the second magnet M3 so as to be directed from the slope M3c of the second magnet M3 to the first magnet M1. Thus, the magnetic field Ha and Hb are generated as magnetic fields directed from the slope M3c slightly upward.

The third embodiment thus configured produces effects similar to those of the first embodiment. Further, the second magnet M3 is higher than the second magnet M2 of the first embodiment and thus the second magnet M3 can be brought close to a magnetic detector 50. Furthermore, upward magnetic fields are generated due to the slope M3c of the second magnet M3 and thus stronger magnetic fields Ha and Hb can act on the magnetic detector 50. The configuration of an encoder using the encoder scale SA of the third embodiment is approximately similar to that of the encoder EC shown in FIG. 4.

Figure 7B:
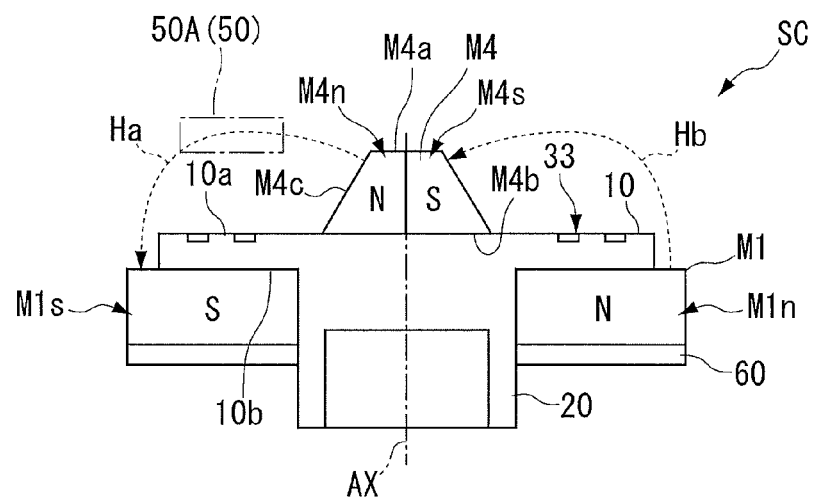

FIG. 7B is a sectional view showing an example of an encoder scale SC of a modification of the third embodiment. As shown in FIG. 7B, the encoder scale SC has a second magnet M4 disposed on a first surface 10a of a substrate 10. The second magnet M4 is formed in a cone. The second magnet M4 is disposed in such a manner that the center thereof overlaps a rotation axis AX. The bottom M4b of the second magnet M4 is fixed to the first surface 10a through an adhesive or the like (not shown), and the second magnet M4 rotates integrally with the substrate 10. The outer diameter of the bottom M4b of the second magnet M4 is set to a size smaller than the inner diameter of an optical pattern 33. Thus, the second magnet M4 is disposed between the rotation axis AX and optical pattern 33. As with the second magnet M3, the second magnet M4 does not block detection light emitted toward the optical pattern 33 or reflected light from the optical pattern 33.

The second magnet M4 has an N-pole M4n magnetized to an N-pole and an S-pole M4s magnetized to an S-pole. The N-pole M4n and S-pole M4s are separated by a straight line passing through the rotation axis AX. In the second magnet M4, the S-pole M4s lies on the right side of the rotation axis AX, and the N-pole M4n lies on the left side of the rotation axis AX.

The distance from the bottom M4b to the top surface M4a (the height of the second magnet M4) is larger than that of the second magnet M2 of the first embodiment. Note that, as with the second magnet M3, the height of the second magnet M4 is set to a height such that the second magnet M4 does not interfere with a circuit board 38 disposed above the scale SC. As shown in FIG. 7B, a magnetic field Ha is generated between an S-pole M1s of a first magnet M1 and the M pole M4n of the second magnet M4 so as to be directed from a slope M4c of the second magnet M4 to the first magnet M1.

Similarly, a magnetic field Hb is generated between a magnetic pole M1*n* of the first magnet M1 and the M pole M4*s* of the second magnet M4 so as to be directed from the slope M4*c* of the second magnet M4 to the first magnet M1. Thus, the magnetic fields Ha and Hb are generated as magnetic fields directed from the slope M4*c* slightly upward.

As in the third embodiment, the second magnet M4 of this modification is higher than the second magnet M2 and of the first embodiment and thus can be brought close to a magnetic detector 50. Further, upward magnetic fields are generated due to the slope M4*c* of the second magnet M4 and thus stronger magnetic fields Ha and Hb can act on the magnetic detector 50. The configuration of an encoder using the encoder scale SB of this modification is approximately similar to that of the encoder EC shown in FIG. 4.

Fourth Embodiment

Figure 8:
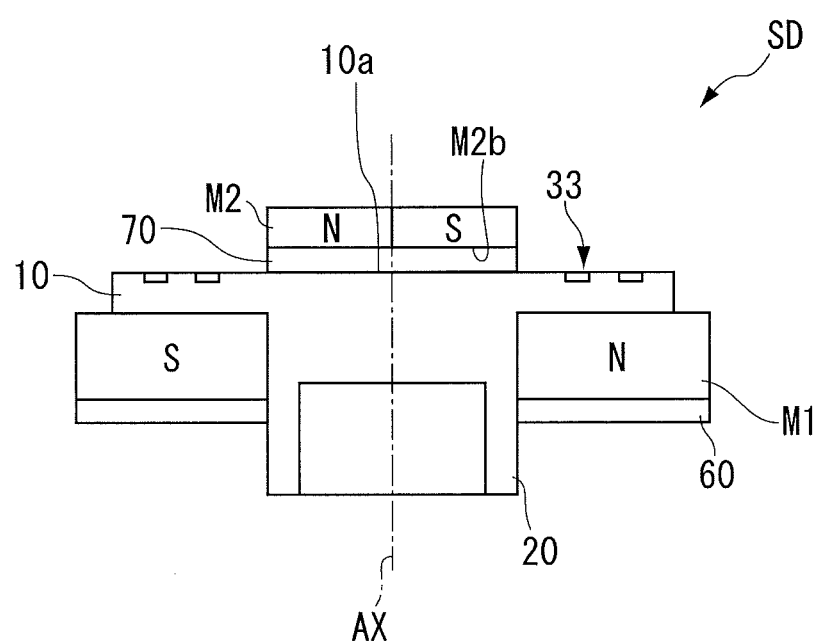
FIG. 8 is a sectional view showing an example of an encoder scale of a fourth embodiment.

FIG. 8 is a sectional view showing the configuration of an encoder scale SD of a fourth embodiment. While, in the first and third embodiments, the second magnet M2 or the like is directly fixed to the first surface 10*a* of the substrate 10, a back yoke 70 may be disposed between a substrate 10 and a second magnet M2, as in an encoder scale SD shown in FIG. 8. Elements identical to or similar to those in the above embodiments are given the same reference signs and the description thereof will be omitted or simplified.

The back yoke 70 is formed, for example, of a soft magnetic material, such as iron, and in a disc shape. The outer diameter of the back yoke 70 is set to a size approximately equal to the outer diameter of the second magnet M2. Accordingly, approximately an entire second surface M2*b* of the second magnet M2 is covered by the back yoke 70. The thickness of the back yoke 70 may be any size and, for example, may be the same as that of a back yoke 60 of a first magnet M1.

According to the fourth embodiment, the back yoke 70 can confine a magnetic field moving from the second magnet M2 in the downward direction (in the direction in which the magnetic field approaches the substrate 10) and strengthen a magnetic field moving to above the scale SD (a magnetic detector 50). Thus, the magnetic detector 50 can detect the magnetic field more reliably and can detect changes in the magnetic field accurately. The configuration of an encoder using the encoder scale SD of the fourth embodiment is approximately similar to that of the encoder EC shown in FIG. 4.

<Drive Apparatus>

Figure 9:
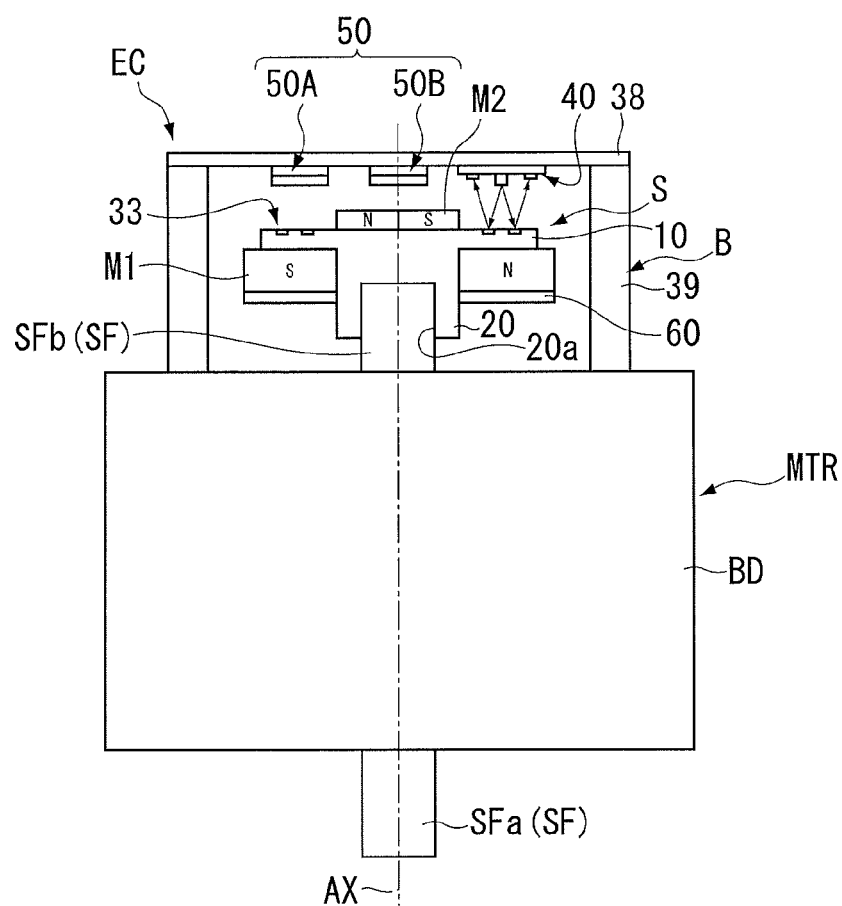
FIG. 9 is a diagram showing an example of an embodiment of a drive apparatus.

A drive apparatus of an embodiment will be described. FIG. 9 is a diagram showing an example of an electric motor MTR serving as an embodiment of a drive apparatus. In the following description, elements identical to or similar to those in the above embodiments are given the same reference signs and the description thereof will be omitted or simplified. As shown in FIG. 9, the motor MTR includes a shaft SF, a main body (drive unit) BD that rotationally moves the shaft SF, and an encoder EC that detects information about the rotation of the shaft SF.

The shaft SF has a load-side end SFa and a non-load-side end SFb. The load-side end SFa is connected to another transmission, such as a reduction gear. A scale S is fixed to the non-load-side end SFb through a fixing unit 20, and the encoder EC is mounted through the fixed scale S. While the scale S and encoder EC are those of the first embodiment, they may be those of other embodiments or modifications.

Since the motor MTR includes the downsized encoder EC having excellent detection accuracy, it can provide excellent controllability of the amount of rotation, as well as can be downsized as a whole. Further, since the motor MTR has the small encoder EC mounted on the non-load-side end SFb, the protrusion from the motor MTR is reduced, allowing the motor MTR to be disposed in a small space. While the motor MTR has been described as an example of the drive apparatus, the drive apparatus may be other types of drive apparatuses having a shaft that rotates using an oil pressure or pneumatic pressure.

<Stage Apparatus>

Figure 10A:
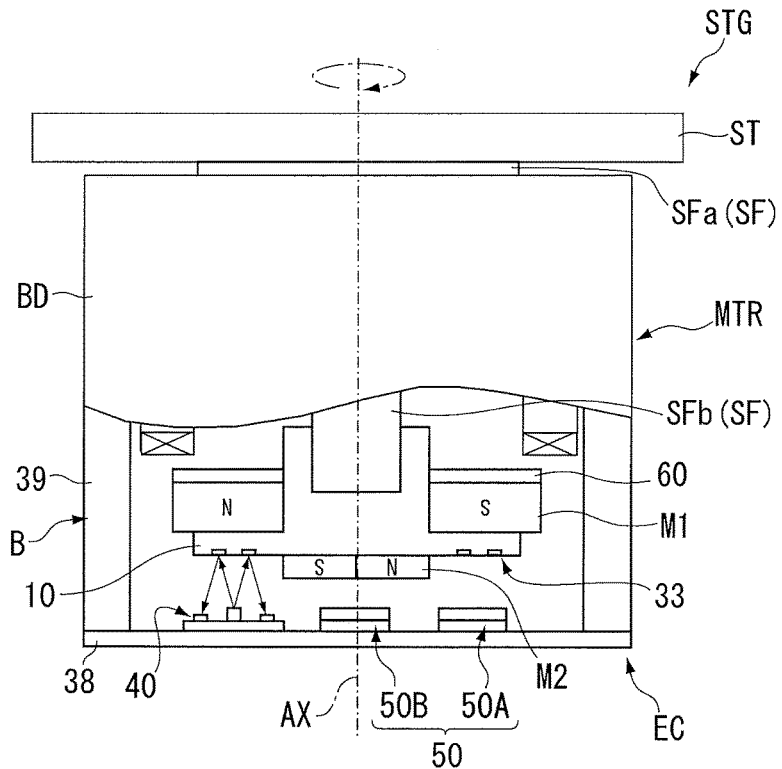
FIG. 10A is a sectional view showing an example of an embodiment of a stage apparatus.

A stage apparatus of an embodiment will be described. FIG. 10A includes perspective views showing an example of an embodiment of a stage apparatus STG. FIG. 10A shows a configuration in which a rotary table (moving object) TB is mounted on the load-side end SFa of the shaft SF of the motor MTR shown in FIG. 9. In the following description, elements identical to or similar to those in the above embodiments are given the same reference signs and the description thereof will be omitted or simplified.

In the stage apparatus STG thus configured, when the motor MTR is driven to rotate the shaft SF, the rotation is transmitted to the rotary table TB. At this time, the encoder EC detects the rotary position of the shaft SF, or the like. Accordingly, by using an output from the encoder EC, the rotary position of the rotary table TB can be detected. A reduction gear or the like may be disposed between the load-side end SFa of the motor MTR and the rotary table TB.

Since the stage apparatus STG includes the small motor MTR having excellent controllability of the amount of rotation, it can adjust the position of the rotary table TB with high accuracy, as well as can be downsized as a whole. The stage apparatus STG may be used as, for example, a rotary table included in a machine tool, such as a lathe.

<Robot Apparatus>

Figure 10B:
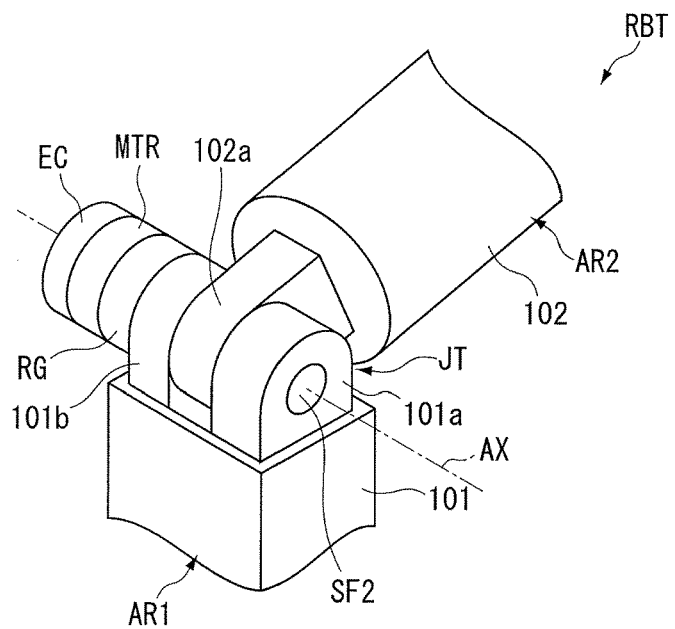
FIG. 10B is a perspective view showing an example of an embodiment of a robot apparatus.

A robot apparatus of an embodiment will be described. FIG. 10B is a perspective view showing an example of an embodiment of a robot apparatus RBT. FIG. 10B schematically shows the configuration of a part (joint) of the robot apparatus RBT. In the following description, elements identical to or similar to those in the above embodiments are given the same reference signs and the description thereof will be omitted or simplified. As shown in FIG. 10B, the robot apparatus RBT includes a first arm AR1, a second arm AR2, and a joint JT, and the first arm AR1 and second arm AR2 are connected through the joint JT.

The first arm AR1 includes an arm 101 and bearings 101*a* and 101*b*. The second arm AR2 includes an arm 102 and a coupling part 102*a*. The coupling part 102*a* is disposed between the bearings 101*a* and 101*b* of the joint JT so as to be integral with a shaft SF2. The shaft SF2 is inserted in both the bearings 101*a* and 101*b* of the joint JT, and an end thereof inserted in the bearing 101*b* is connected to a reduction gear RG through the bearing 101*b*.

The reduction gear RG is connected to a motor MTR and reduces the rotation of the motor MTR to, for example, one-hundredth or the like and then transmits the reduced rotation to the shaft SF2. The motor MTR is the motor MTR shown in FIG. 9. Although not shown in FIG. 10B, the load-side end SFa of the shaft SF of the motor MTR is connected to the reduction gear RG. Mounted on the non-load-side end SFb of the shaft SF of the motor MTR is a scale S of an encoder EC.

In the robot apparatus RBT thus configured, when the motor MTR is driven to rotate the shaft SF, the rotation is transmitted to the shaft SF2 through the reduction gear RG.

When the shaft SF2 rotates, the coupling part 102a rotates integrally and thus second arm AR2 rotates with respect to the first arm AR1. At this time, the encoder EC detects the rotary position of the shaft SF, or the like. Accordingly, by using an output from the encoder EC, the rotary position of the second arm AR2 can be detected.

Since the robot apparatus RBT includes the small motor MTR having excellent detection accuracy, it can control the rotation of the second arm AR2 with high accuracy, as well as can be downsized as a whole. Also, since the robot apparatus RBT includes the small encoder EC, the protrusion from the joint JT is reduced, allowing for suppression of the interference with another device or the like of the protrusion. The robot apparatus RBT is not limited to the above configuration, and various types of robot apparatuses having a joint, for example, can have the motor MTR mounted thereon.

While the embodiments have been described above, the present invention is not limited thereto. Various changes can be made to the embodiments without departing from the spirit and scope of the invention. For example, while, in the embodiments and modifications, the scale S or the like having the reflection-type optical pattern 33 has been described as an example, a scale having a light transmission-type optical pattern, an encoder using such a scale, and the like may be used. Even when a light transmission-type optical pattern is used, forms similar to the embodiments and modifications can be applied. Note that the disposition of a light reflection pattern as the optical pattern 33 eliminates the need to make a space for an optical path on the second surface of the substrate. This is advantageous in that the diameter of the first magnet can be increased.

While, in the third embodiment, the conical second magnet and the truncated conical second magnet have been described as examples, a semi-spherical second magnet, for example, may be used. While, in the second embodiment, the arc-shaped magnetic yoke 16 is disposed on the first surface 10a of the substrate 10, a magnetic yoke having a shape obtained by dividing a cone or truncated cone, for example, may be used.

DESCRIPTION OF REFERENCE SIGNS

S, SA, SB, SC, SD . . . scale (encoder scale) D, D1 . . . rotation direction M1 . . . first magnet M2, M3, M4 . . . second magnet H1 to H4, Ha, Hb . . . magnetic field H5, H6 . . . combined magnetic field AX . . . rotation axis EC . . . encoder SF . . . shaft (rotating member) MTR . . . motor STG . . . stage apparatus RBT . . . robot apparatus 10, 10A . . . substrate 10a, 10Aa . . . first surface 10b, 10Ab . . . second surface 10c . . . peripheral edge 15 . . . magnetic circuit 16 . . . magnetic yoke 20 . . . fixing unit 33 . . . optical pattern 40 . . . light detector 50 . . . magnetic detector 51 . . . bias magnet 60, 70 . . . back yoke

What is claimed is:

1. An encoder scale comprising:
a substrate configured to rotate about a rotation axis and that has a first surface crossing the rotation axis and a second surface different from the first surface;
an optical pattern formed on the first surface;
a first magnet disposed on the second surface, the first magnet having different magnetic poles set therein with the rotation axis therebetween; and
a second magnet or magnetic yoke that (i) is disposed on the first surface, (ii) is disposed between the rotation axis and the optical pattern, and (iii) is configured to generate magnetic fields with the magnetic poles of the first magnet.

2. The encoder scale of claim 1, wherein the first magnet is disposed so as to partially protrude from a peripheral edge of the substrate.

3. The encoder scale of claim 1, further comprising a fixed unit that is disposed on the second surface and that is configured to be fixed to a rotating member to be measured, wherein the first magnet is formed in a circle and disposed so as to surround the fixed unit.

4. The encoder scale of claim 1, wherein the second magnet is in the shape of a disc, a cone, or a truncated cone about the rotation axis.

5. The encoder scale of claim 4, wherein the second magnet is disposed in such a manner that magnetic poles thereof differ from the magnetic poles of the first magnet in a direction of the rotation axis.

6. The encoder scale of claim 4, wherein a back yoke is disposed between the second magnet and the substrate.

7. The encoder scale of claim 1, wherein the magnetic yoke is magnetically connected to the magnetic poles of the first magnet, magnetic poles of the magnetic yoke differing from the magnetic poles of the first magnet in a direction of the rotation axis.

8. The encoder scale of claim 7, wherein the magnetic yoke and the first magnet are magnetically connected through a magnetic circuit formed on the substrate.

9. The encoder scale of claim 1, wherein the first magnet has a larger volume than the second magnet or the magnetic yoke.

10. The encoder scale of claim 1, wherein the optical pattern is a light reflection pattern.

11. An encoder scale comprising:
a substrate configured to rotate about a rotation axis and that has a first surface and a second surface, the second surface being a back side of the first surface;
an optical pattern formed on the second surface;
a first magnet disposed on the first surface; and
a second magnet or magnetic yoke that (i) is disposed on the second surface, (ii) is disposed between the rotation axis and the optical pattern, and (iii) generates a magnetic field with the first magnet, the magnetic field being detectable by a magnetic detector.

12. An encoder comprising:
the encoder scale of claim 1, the optical pattern of the encoder scale being disposed in a rotation direction of the rotation axis, and the encoder scale being configured to make a change in the magnetic field at least once during one rotation about the rotation axis;
a light detector configured to detect light through the optical pattern; and
a magnetic detector configured to detect the change in the magnetic field.

13. An encoder comprising:
a scale configured to rotate about a rotation axis and that has a first surface and a second surface, the second surface being a back side of the first surface;
a first magnet disposed on the first surface;
an optical pattern formed on the second surface;
a second magnet or magnetic yoke that is disposed on the second surface and between the rotation axis and the optical pattern; and
a magnetic detector configured to detect a magnetic field generated between the first magnet and the second magnet or magnetic yoke.

14. The encoder of claim 13, wherein an outer diameter of the second magnet or magnetic yoke is different from an outer diameter of the first magnet.

15. The encoder of claim 13, wherein
the magnetic detector is disposed so as to be opposed to the second surface, and
an outer diameter of the second magnet or magnetic yoke is smaller than an outer diameter of the first magnet.

16. The encoder of claim 15, wherein the magnetic detector is disposed outside the outer diameter of the second magnet or magnetic yoke in a radial direction of the scale.

17. The encoder of claim 13, wherein:
the scale comprises a substrate configured to rotate about the rotation axis, and
the first magnet is disposed on the substrate in such a manner that an outer diameter thereof protrudes from a peripheral edge of the substrate.

18. The encoder of claim 13, wherein the optical pattern is formed so as to be closer to an outer circumference of the second surface than the second magnet or magnetic yoke.

19. A drive apparatus comprising:
a rotating member;
a drive unit configured to rotate the rotating member; and
the encoder of claim 13, fixed to the rotating member and configured to detect position information of the rotating member.

20. A stage apparatus comprising:
a moving object; and
the drive apparatus of claim 19, which is configured to move the moving object.

* * * * *